US008094801B2

(12) United States Patent
Clark et al.

(10) Patent No.: US 8,094,801 B2
(45) Date of Patent: Jan. 10, 2012

(54) PROVIDING OF SERVICE(S) BY A SERVICE CONTROL COMPONENT TO TELEPHONY DEVICE(S) ON A CALL THROUGH EMPLOYMENT DATA STREAM(S) ASSOCIATED WITH THE CALL

(75) Inventors: Edward Alan Clark, Sugar Grove, IL (US); Stuart O. Goldman, Scottsdale, AZ (US)

(73) Assignee: Alcatel Lucent, Paris (FR)

( * ) Notice: Subject to any disclaimer, the term of this patent is extended or adjusted under 35 U.S.C. 154(b) by 2051 days.

(21) Appl. No.: 10/736,408

(22) Filed: Dec. 15, 2003

(65) Prior Publication Data

US 2005/0129209 A1   Jun. 16, 2005

(51) Int. Cl.
 *H04M 7/00* (2006.01)
 *H04M 3/42* (2006.01)

(52) U.S. Cl. .............................. 379/221.09; 379/221.11

(58) Field of Classification Search ............. 379/220.01, 379/221.08–221.09, 221.11
See application file for complete search history.

(56) References Cited

U.S. PATENT DOCUMENTS

| 6,608,891 | B1 * | 8/2003 | Pelletier et al. | 379/207.02 |
| 6,625,141 | B1 * | 9/2003 | Glitho et al. | 370/352 |
| 2003/0161297 | A1 * | 8/2003 | Noda et al. | 370/352 |
| 2003/0228011 | A1 * | 12/2003 | Gibson | 379/211.02 |

* cited by examiner

*Primary Examiner* — Rasha Al Aubaidi
(74) *Attorney, Agent, or Firm* — Carmen Patti Law Group, LLC

(57) ABSTRACT

A service control component of an apparatus in one example provides to one or more telephony devices of a plurality of telephony devices on a call, one or more services associated with one or more numbers associated with the one or more telephony devices on the call through employment of one or more data streams associated with the call.

28 Claims, 4 Drawing Sheets

PROVIDING OF SERVICE(S) BY A SERVICE CONTROL COMPONENT TO TELEPHONY DEVICE(S) ON A CALL THROUGH EMPLOYMENT DATA STREAM(S) ASSOCIATED WITH THE CALL

CROSS-REFERENCE TO RELATED APPLICATIONS

This application contains subject matter that is related to the subject matter of the following applications, which are assigned to the same assignee as this application. The below-listed applications are hereby incorporated herein by reference in their entireties.

"DATA STREAM ASSOCIATION WITH CALL THROUGH EMPLOYMENT OF IDENTIFIER WITHIN MESSAGES ASSOCIATED WITH THE CALL," by Clark, et al., Ser. No. 10/698,573, filed Oct. 31, 2003.

"SERVICE(S) PROVIDED TO TELEPHONY DEVICE (S) THROUGH EMPLOYMENT OF DATA STREAM(S) ASSOCIATED WITH THE CALL," by Edward A. Clark, Ser. No. 10/698,327, filed Oct. 31, 2003.

"SERVICE(S) PROVIDED TO TELEPHONY DEVICE THROUGH EMPLOYMENT OF DATA STREAM(S) ASSOCIATED WITH CALL," by Edward A. Clark, Ser. No. 10/698,141, filed Oct. 31, 2003.

"TRANSMISSION OF USER INPUT(S) TO TELEPHONY DEVICE(S) THROUGH EMPLOYMENT OF DATA STREAM(S) ASSOCIATED WITH CALL," by Edward A. Clark, Ser. No. 10/698,328, filed Oct. 31, 2003.

TECHNICAL FIELD

The invention relates generally to telecommunications and more particularly to providing of services that are associated a telephony device.

BACKGROUND

A user of a calling telephony device in one example establishes a call with a user of a called telephony device. The user of the calling telephony device and/or the user of the called telephony device receive one or more services associated with the call. For example, one or more Service Control Points ("SCPs") provide the services to the calling telephony device and/or the called telephony device.

The Service Control Points receive one or more non-circuit messages associated with the call from a switch, for example, a Service Switching Point ("SSP"). The non-circuit messages comprise one or more Signaling System 7 ("SS7") Transactional Capabilities Application Part ("TCAP") messages. The Service Control Points in cooperation with one or more media resource servers establish one or more voice channels with the calling telephony device and/or the called telephony device. The Service Control Points provide the services to the calling telephony device and/or called telephony device based on information present within the non-circuit messages and/or within the voice channels.

The Service Control Points provide the services to one or more users of the calling telephony device and/or the called telephony device. The Service Control Points provide the services through employment of the non-circuit messages and/or information collected by a media resource server via the voice channels associated with the call. As one shortcoming, the Service Control Point provides services that are restricted to the information contained within the non-circuit messages and/or from the media resource servers. Restricting the services that potentially could be provided by the Service Control Point is undesirable as it limits the services provided to the users of the telephony devices on the network. Furthermore, restricting the services provided by the Service Control Point is undesirable in that it limits potential revenue obtained by one or more network service providers associated with the call.

Thus, a need exists to provide one or more services that are not limited to information present within the non-circuit messages and/or the voice channels associated with the call.

SUMMARY

The invention in one embodiment encompasses an apparatus. A service control component provides to one or more telephony devices of a plurality of telephony devices on a call, one or more services associated with one or more numbers associated with the one or more telephony devices on the call through employment of one or more data streams associated with the call.

Another embodiment of the invention encompasses a method. One or more service control components provide one or more services to one or more telephony devices on a call through employment of one or more data streams associated with the call.

Yet another embodiment of the invention encompasses an article. The article comprises one or more computer-readable media. The article comprises means in the computer-readable medium for providing, by one or more service control components, one or more services to one or more telephony devices on a call through employment of one or more data streams associated with the call.

DESCRIPTION OF THE DRAWINGS

Features of exemplary implementations of the invention will become apparent from the description, the claims, and the accompanying drawings in which:

DETAILED DESCRIPTION

Figure 1:
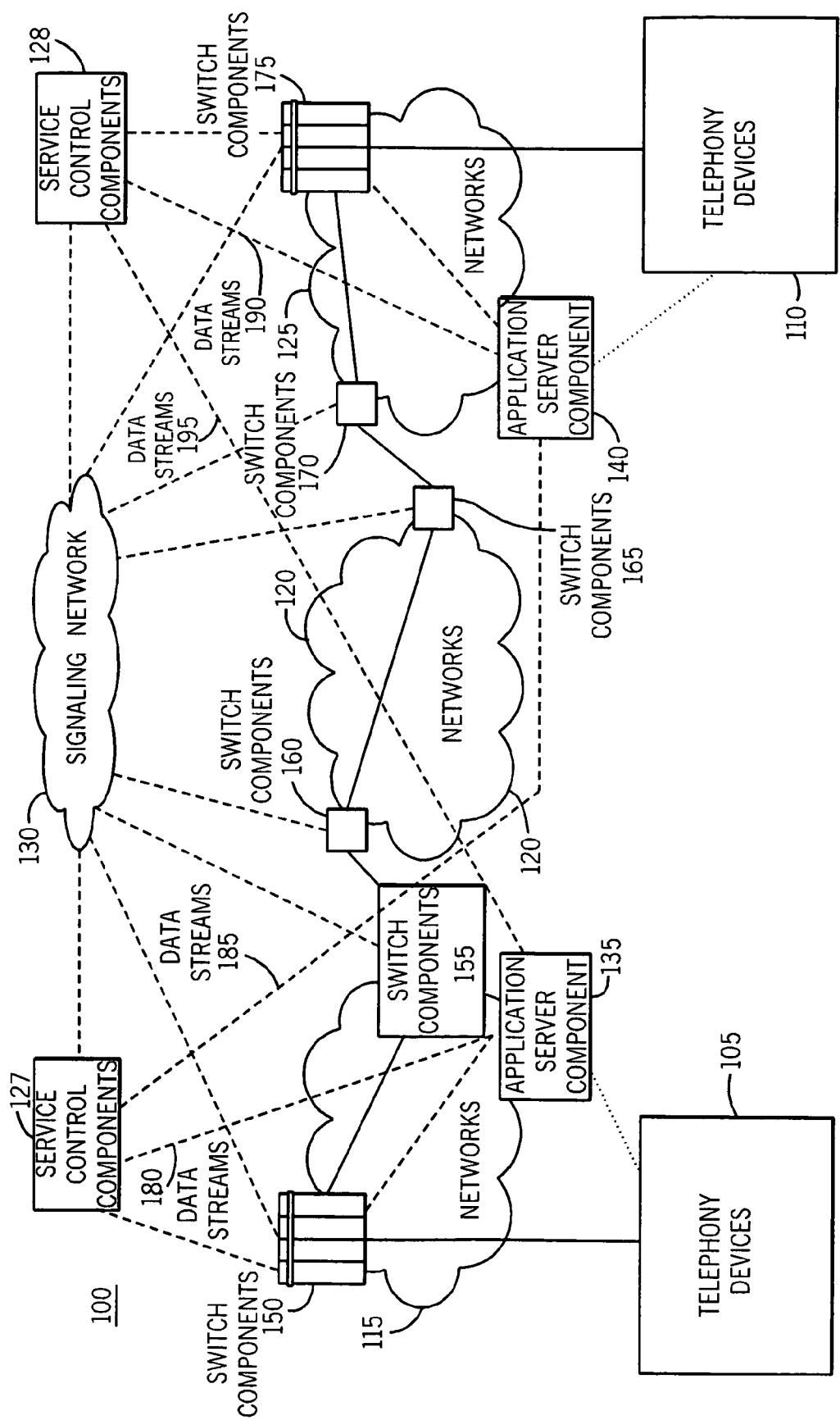
FIG. 1 is a representation of one exemplary implementation of an apparatus that comprises one or more networks, one or more telephony devices, and one or more service control components.

Turning to FIG. 1, an apparatus 100 in one example comprises one or more telephony devices 105 and 110, one or more networks 115, 120, 125, and 130, and one or more service control components 127 and 128. The telephony devices 105 and 110 in one example comprise one or more Customer Premise Equipments ("CPEs"), such as a computer, a web-enabled device, and/or a telephone. The telephony devices 105 and 110 initiate and/or receive one or more calls. In one example, the telephony device 105 initiates a call to the telephony device 110. In another example, the telephony device 105 receives a call initiated by the telephony device 110.

The telephony devices 105 and 110 initiate calls through employment of a call request signaling. The call request signaling in one example comprises a Dual-Tone Multi-Frequency ("DTMF" or Touch Tone) signaling, as will be understood by those skilled in the art. The telephony device 105 and 110 initiate the calls on the networks 115, 120, 125, and/or 130.

The networks 115, 120, and 125 in one example comprise one or more service provider networks. In one example, the networks 115, 120, and 125 comprise a Public Switched Telephony Network ("PSTN") and/or an Integrated Services Digital Network ("ISDN"). The network 130 in one example comprises a signaling network, for example, a Signaling System 7 ("SS7") network. The networks 115, 120, 125, and 130, in one example comprise one or more application server components 135 and 140, and one or more, switch components 150, 155, 160, 165, 170, and 175. The one or more application server components 135 and 140 may be connected to at least one of the one or more switch components 150, 155, 160, 165, 170, and 175 as shown in FIG. 1.

One or more of the networks 115, 120, 125, and 130 communicate with one or more other of the networks 115, 120, 125, and/or 130 through employment of one or more call control protocols. The one or more call control protocols in one example comprise an Integrated Services Digital Network User Part ("ISUP") protocol, a Session Initiation Protocol ("SIP"), a Bearer Independent Call Control ("BICC") protocol, and/or a Signaling System 7 ("SS7") Transaction Capabilities Application Part ("TCAP") protocol. The networks 115, 120, 125, and/or 130 cooperate to establish one or more calls between the telephony device 105 and the telephony device 110.

The service control components 127 and 128 in one example comprise Advanced Intelligence Network ("AIN") Service Control Points ("SCPs"). The service control components 127 and/or 128 comprise information associated with treatment of one or more calls for one or more users of the telephony devices 105 and/or 110. The service control components 127 and/or 128 provide one or more enhanced call processing services associated with one or more users of the telephony devices 105 and/or 110 for one or more calls. In one example, the service control component 127 provides an eight hundred number lookup service for calls directed to an eight hundred number, for example, 1-800-555-1000.

In another example, the service control component 128 and a media resource server cooperate to provide a privacy management service for a user of the telephony device 105, as will be appreciated by those skilled in the art. For example, The service control components 127 and/or 128 and the media resource server cooperate to obtain a voice identification and/or a Personal Identification Number ("PIN") associated with a user of a calling telephony device, for example, a user of the telephony device 110. The service control component 128 and the media resource server in one example obtain the voice identification and/or the Personal Identification Number from the user of the telephony device 110 through employment of one or more voice channels. The service control component 128 and the media resource server cooperate to provide to a called party, for example, the user of the telephony device 105 the voice identification and/or the Personal Identification Number of the user of the telephony device 110. The user of the telephony device 105 may employ the voice identification and/or the Personal Identification Number to accept and/or decline the call, as will be understood by those skilled in the art.

As shown in FIG. 1, the service control components 127 and/or 128 are connected to the application server components 135 and/or 140 and communicate with the application server components 135 and/or 140 through employment of one or more data streams, for example, data streams 180, 185, 190, and 195. The service control components 127 and/or 128 and the application server components 135 and/or 140 employ one or more data stream control protocols to establish the data streams 180, 185, 190, and/or 195. The data stream control protocols in one example comprise a User Datagram Protocol ("UDP"), a Transfer Control Protocol ("TCP"), and/or the Session Initiation Protocol.

The service control components 127 and/or 128 communicate with the service control components 127 and/or 128, and/or one or more of the switch components 150, 155, 160, 165, 170, and/or 175, through employment of one or more service control protocols. One or more of the service control components 127 and/or 128 and/or one or more of the switch components 150, 155, 160, 165, 170, and 175 employ one or more of the service control protocols to communicate call or session events, status information, and/or session action requests, to/from one or more of the service control components 127 and/or 128 and/or one or more of the switch components 150, 155, 160, 165, 170, and 175. The service control protocols in one example comprise one or more non-circuit based signaling such as one or more of the Integrated Services Digital Network User Part protocol, the Session Initiation Protocol, the Bearer Independent Call Control protocol, a Signaling Connection Control Point ("SCCP") protocol, and the Signaling System 7 (SS7) Transaction Capabilities Application Part protocol. In one example, the service control components 127 and/or 128 cooperate with the switch components 150, 155, 160, 165, 170, and/or 175, to route the call to a voice mail system.

The application server components 135 and 140 comprise one or more application servers. The application server components 135 and/or 140 comprise store information associated with one or more end-users, for example, the telephony devices 105 and/or 110. For example, the application server components 135 and/or 140 store one or more instructions associated with the one or more enhanced call processing services. The application server components 135 and/or 140 employ one or more telephone directory numbers (e.g., one or more called and/or calling telephony directory numbers) associated with the users of the telephony devices 105 and/or 110 and to select the one or more instructions, as will be understood by those skilled in the art. One or more of the application server components 135 and/or 140 communicate with the application server components 135 and/or 140 through employment of one or more of the data stream control protocols. The application server components 135 and/or 140 communicate with one or more of the switch components 150, 155, 160, 165, 170, and/or 175 through employment of one or more of the service control protocols.

The application server components 135 and/or 140 and the telephony devices 105 and/or 110 cooperate to establish one or more web portals. The application server components 135 and/or 140 interact with the telephony devices 105 and/or 110 through employment of the web portals. For example, the application server components 135 and/or 140 receive one or more user inputs from one or more users of the telephony devices 105 and/or 110 through employment of the web portals. In one example, the application server components 135 and/or 140 provide one or more interfaces through employment of the one or more web portals to the one or more users of the telephony devices 105 and/or 110. The users of the telephony devices 105 and/or 110 in one example employ the one or more interfaces to interact with the one or more application server components 135 and/or 140.

The switch components 150, 155, 160, 165, 170, and/or 175 in one example comprise one or more telephony switches, for example, one or more Service Switching Points ("SSPs"). The switch components 150, 155, 160, 165, 170, and/or 175 communicate with the telephony devices 105 and/or 110 through employment of the call request signaling. For example, the switch components 150, 155, 160, 165, 170, and/or 175 and the telephony devices 105 and/or 110 cooperate to establish a call through employment of the call request signaling. The telephony devices 105 and/or 110 in one example initiate one or more dial tones, for example, one or more dial tones corresponding to a called party number, to the switch components 150, 155, 160, 165, 170, and/or 175. The switch components 150, 155, 160, 165, 170, and/or 175 communicate with one or more other of the switch components 150, 155, 160, 165, 170, and/or 175 through employment of one or more of the call control protocols. In one example, the switch components 150, 155, 160, 165, 170, and/or 175 are pre-provisioned to communicate with the service control components 127 and/or 128. In another example, the switch components 150, 155, 160, 165, 170, and/or 175 are pre-provisioned to communicate with the application server components 135 and/or 140.

The switch components 150, 155, 160, 165, 170, and/or 175 in one example contain data specific to the users of the telephony devices 105 and/or 110. For example, the switch components 150, 155, 160, 165, 170, and/or 175 store one or more addresses, for example, one or more network addresses, associated with the one or more application server components 135 and/or 140. In one example, where the user of the telephony device 105 is associated with the application server component 135, a service provider associated with the application server component 135 provides an address associated with the application server component 135 to the data as part of a service agreement process, as will be understood by those skilled in the art.

The service control components 127 and/or 128 and the application server components 135 and/or 140 cooperate through employment of the data streams 180, 185, 190, and/or 195, to provide one or more services, for example, one or more enhanced services, to one or more users of the telephony devices 105 and/or 110. The service control components 127 and/or 128 and the application server components 135 and/or 140 communicate information associated with the telephony devices 105 and/or 110 through employment of the data streams 180, 185, 190, and/or 195. The service control components 127 and/or 128 and the application server components 135 and/or 140 cooperate through employment of the data streams 180, 185, 190, and/or 195 to obtain a first portion of the information from the application server components 135 and/or 140 and a second portion of the information from the service control components 127 and/or 128. The service control components 127 and/or 128 and the application server components 135 and/or 140 provide the services based on the first portion of the information and the second portion of the information associated with the telephony devices 105 and/or 110.

The service control components 127 and/or 128 and the application server components 135 and/or 140 in one example associate the data streams 180, 185, 190, and/or 195 with one or more calls. The service control components 127 and/or 128 and the application server components 135 and/or 140 employ one or more identifiers 505 (FIG. 4), 605 (FIG. 5) and/or 705 (FIG. 6) to associate the data streams 180, 185, 190, and/or 195 with the one or more calls. The identifiers 505, 605, and/or 705 comprise information to distinguish one call associated with the service control components 127 and/or 128 and the application server components 135 and/or 140 from another call associated with the service control components 127 and/or 128 and the application server components 135 and/or 140. An identifier 505 in one example comprises a network address 510, a port 515, and an identification tag 520. The network address 510 in one example comprises an Internet Protocol ("IP") address associated with one of the service control components 127 and/or 128 and/or the application server components 135 and/or 140. The port 515 comprises a port number, for example, port 8080, associated with one of the service control components 127 and/or 128 and/or one of the application server components 135 and/or 140. The port 515 in one example is associated with the one or more interactions available from the one of the service control components 127 and/or 128 and/or one of the application server components 135 and/or 140 for a call. The identification tag 520 serves to uniquely identify the call, as will be appreciated by those skilled in the art.

The service control components 127 and/or 128 and the application server components 135 and/or 140 establish the data streams 180, 185, 190, and/or 195 through employment of one or more messages 702 (FIG. 6), for example, one or more data stream request messages. Where a message 702 comprises a data stream request message, the service control components 127 and/or 128 and/or the application server components 135 and/or 140 provide a portion of the identifier 505 within the message 702. The message 702 conforms to one or more of the data stream control protocols.

Figure 4:
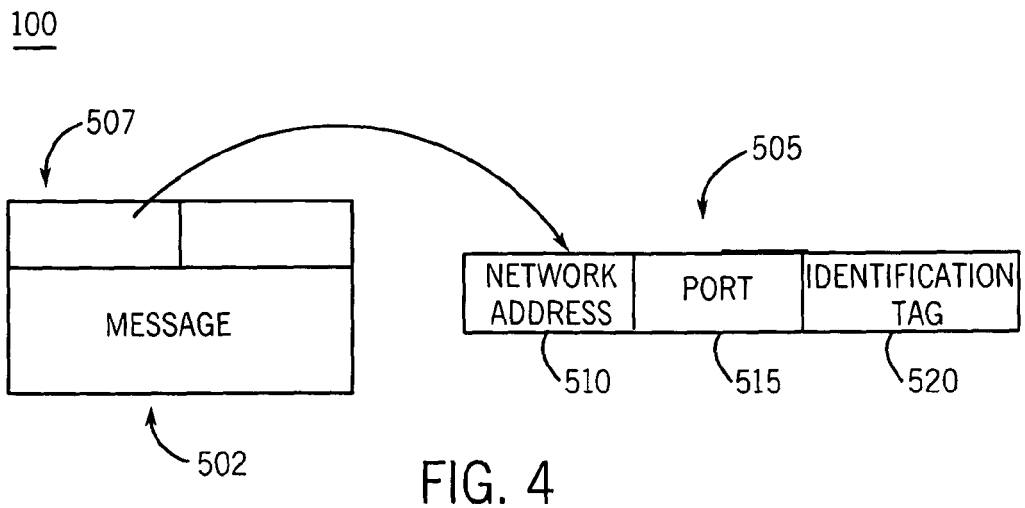
FIG. 4 is a representation of an exemplary message employed in establishment of the data stream by the application server component and the switch component of the apparatus of FIG. 1.
Figure 5:
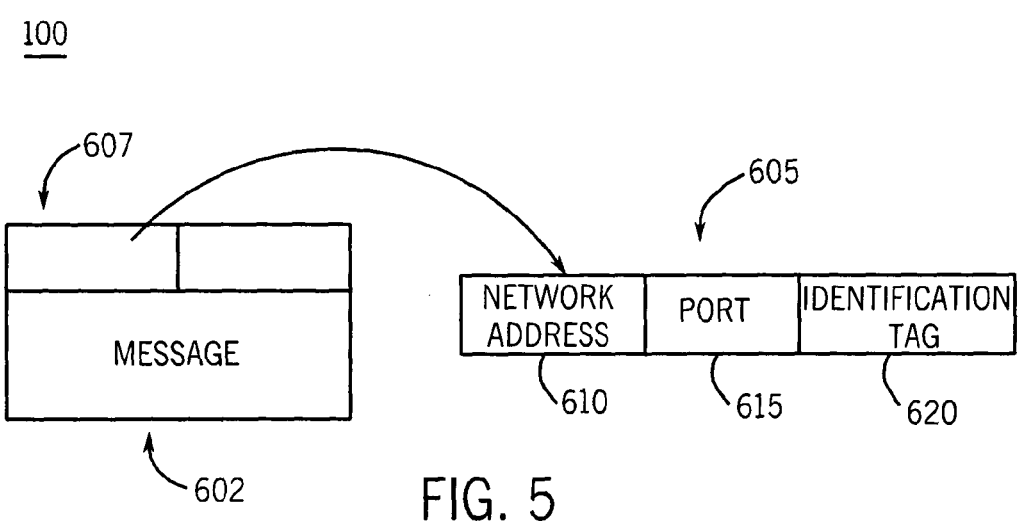
FIG. 5 is a representation of another exemplary message employed in establishment of the data stream by the application server component and the switch component of the apparatus of FIG. 1.
Figure 6:
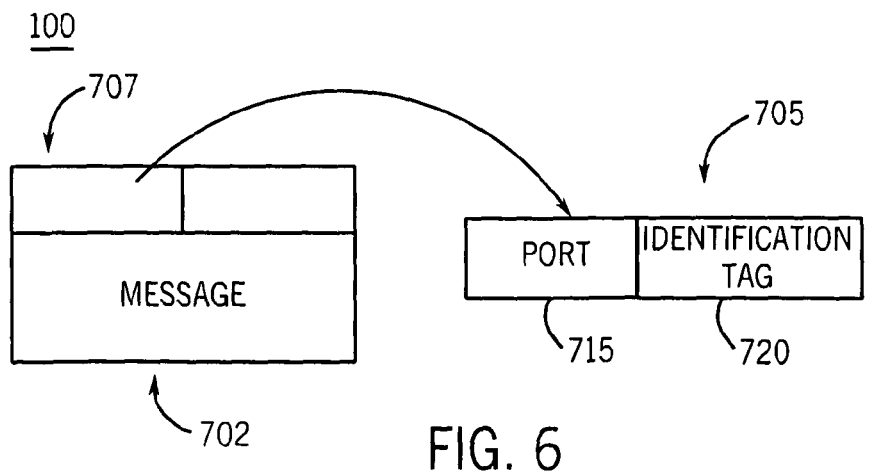
FIG. 6 is a representation of yet another exemplary message employed in establishment of the data stream by the application server component and the switch component of the apparatus of FIG. 1.

Referring to FIGS. 4-6, the message 502 and 602 conform to the call control protocol. The message 702 conforms to the data stream request protocol. The messages 502, 602, and 702 comprise one or more generic parameters 507, 607, and 707. The generic parameters 507 and 607 in one example comprise one or more Generic Address Parameters ("GAPs").

The message 502 in one example comprises an initiation message. The message 502 comprises the generic parameter 507. The generic parameter 507 in one example comprises the identifier 505. The switch component 150 and the application server component 135 in one example provide the identifier 505 within the generic parameter 507.

The message 602 in one example comprises a request-back message. The message 602 comprises the generic parameter 607. The generic parameter 607 in one example comprises the identifier 605. The identifier 605 in one example comprises a network address 610, a port 615, and an identification tag 620.

The message 702 in one example comprises a data stream request message. The message 702 comprises a portion of an identifier, for example, the identifier 505, within the generic parameter 707 of the message 702. The generic parameter 707 comprises a port 715 and an identification tag 720. In one example, the port 715 comprises the port 515 or 615. In another example, the identification tag 720 comprises the identification tag 520 or 620. The application server component 135 in one example routes the message 702 to a network address 710.

In one example, the network address 710, the port 715, and the identification tag 720 comprise the network address 510, the port 515, and the identification tag 520. In another example, the network address 710, the port 715, and the identification tag 720 comprise the network address 610, the port 615, and the identification tag 620.

In one example, the service control components 127 and/or 128 and/or the application server components 135 and/or 140 select the identifier 505 of a plurality of identifiers 505. In another example, the service control components 127 and/or 128 and/or the application server components 135 and/or 140 select the identifier 605 of a plurality of identifiers 605. The service control components 127 and/or 128 and/or the application server components 135 and/or 140 associate the identifier 505 and/or 605 with a call.

The identifier 505 and/or 605 selected by the service control components 127 and/or 128 and/or the application server components 135 and/or 140 in one example serves to uniquely identify the call. For example, the service control component 127 selects a first identifier 505 to associate with a first call, and a second identifier 505 to associate with a second call. The service control component 127 distinguishes the first call from the second call through employment of the first identifier 505 and the second identifier 505, as will be appreciated by those skilled in the art. In one example, the service control component 127 selects the identifier 505 and/or 605 from the plurality of identifiers 505 and/or 605 available for the call through employment of a random selection method. In another example, the service control component 128 employs a static selection method to select the identifier 505 and/or 605. In yet another example, the service control component 127 employs a priority selection method to select the identifier 505 and/or 605. In still yet another example, the service control component 128 selects the identifier 505 and/or 605 based on information associated with a call provided by the switch component 150.

For example, where the service control component 127 selects the identifier 505, the service control component 127 selects: the network address 510 of a plurality of network addresses 510 associated with the service control component 127; the port 515 of a plurality of ports 515 associated with the service control component 127; and the identification tag 520 of a plurality of identification tags 520 associated with the service control component 127.

In another example, the service control components 127 and/or 128 and the application server components 135 and/or 140 associate a call with the identifier 505 and/or 605 within the message 502, for example, the initiation message. Upon receipt of the message 502, the switch component 175 in one example communicates with the service control component 128 to provide the identifier 505 to the service control component 128. The service control component 128 stores the identifier 505.

The service control components 127 and/or 128 and the application server components 135 and/or 140 in one example associate the data streams 180, 185, 190, and/or 195 with one or more calls through employment of the identifiers 505 and/or 605. The service control components 127 and/or 128 and the application server components 135 and/or 140 in one example employ the identifier 505 to distinguish one or more data streams associated with a first call from one or more data streams associated with a second call.

For example, the service control component 127 associates the first call with the first identifier 505. The service control component 127 and the application server component 135 cooperate through employment of the first identifier 505 to establish the data stream 180. The service control component 127 and the application server component 135 associate the second call with the second identifier 505. The service control component 127 and the application server component 140 cooperate to establish the data stream 185 associated with the second call. The service control component 127 employ the first identifier 505 and the second identifier 505 to distinguish the data stream 180 associated with the first call from the data stream 185 associated with the second call.

The service control components 127 and/or 128 and the application server components 135 and/or 140 cooperate through employment of the data streams 180, 185, 190, and/or 195 to transmit the one or more user inputs received from the one or more web portals. In another example, the service control components 127 and/or 128 and the application server components 135 and/or 140 cooperate through employment of the data streams 180, 185, 190, and/or 195 to provide the one or more services to the telephony devices 105 and/or 110.

In one example, the service control components 127 and/or 128 and the application server components 135 and/or 140 cooperate to transfer data associated with one or more interfaces through employment of the data streams 180, 185, 190, and/or 195. The interfaces in one example are associated with the one or more services. The application server components 135 and/or 140 employ the web portals to provide the interfaces to the users of the telephony devices 105 and/or 110. For example, the application server component 140 transfers data to form an interface to the application server component 135. The interfaces in one example comprise one or more eXtended Markup Language ("XML") interfaces. The application server components 135 and/or 140 employ one or more internet protocols such as HyperText Transfer Protocol ("HTTP") to provide the interfaces to the telephony devices 105 and/or 110. The telephony devices 105 and/or 110 employ the one or more interfaces to interact with the one or more services through initiation of the user inputs.

The application server components 135 and/or 140 in one example transmit the user inputs to the service control components 127 and/or 128 on a call-by-call basis through employment of the identifiers 505 and/or 605. The application server components 135 and/or 140 associate the web portals with a call through employment of the identifier 505 and/or 605. For example, the service control component 127 and the application server component 135 employ the identifier 505 to distinguish a first one or more user inputs associated with the first call from a second one or more interactions associated with the second call.

To establish a call, the switch components 150, 155, 160, 165, 170, and/or 175 employ the message 502, for example, the initiation message, and/or the message 602, for example, the request-back message. The Integrated Services Digital Network User Part protocol comprises the message 502, for example, an Initial Address Message ("IAM"), and the message 602, for example, a Call ProGress ("CPG") message. The switch components 150, 155, 160, 165, 170, and/or 175 provide the identifier 505 and/or 605 within the messages 502 and/or 602 associated with the call. The switch components 150, 155, 160, 165, 170, and/or 175 associate the call with the identifier 505 and/or 605. The switch components 150, 155, 160, 165, 170, and/or 175 cooperate with the service control components 127 and/or 128 and the application server components 135 and/or 140 to transmit the one or more user inputs for the call.

The switch components 150, 155, 160, 165, 170, and/or 175 provide the identifier 505 within the message 502 and/or the identifier 605 within the message 602 associated with a call. In one example, the switch component 150 inserts the identifier 505 into the generic parameter 507 of the message

502. In another example, switch component 175 inserts the identifier 605 into the generic parameter 607 of the message 602.

For example, the switch component 150 is pre-provisioned to communicate with the service control component 127 upon receipt of the message 502, for example, the initiation message, the switch component 150 provides the identifier 505 from within the message 502 to the service control component 127. In another example, the switch component 175 is pre-provisioned to communicate with the application server component 135 to obtain the identifier 505 upon sending of the message 602 from the switch component 150.

The message 502, for example, the initiation message, is received by the switch component 175. Where the message 502 omits the identifier 505, the switch component 175 communicates with the service control component 128 to obtain the identifier 605. The switch component 175 inserts the identifier 605 into the message 602, for example, the request-back message. The switch component 175 sends the message 602 to the switch component 150.

The switch components 150, 155, 160, 165, 170, and/or 175 associate the identifier 505 with a call. The switch components 150, 155, 160, 165, 170, and/or 175 associate the identifier 505 with the call through employment of the message 502. For example, the switch component 150 associates the identifier 505 with the call established by the message 502 through employment of the message 502.

An illustrative description of exemplary operation of the apparatus 100 is presented, for explanatory purposes.

Figure 2:
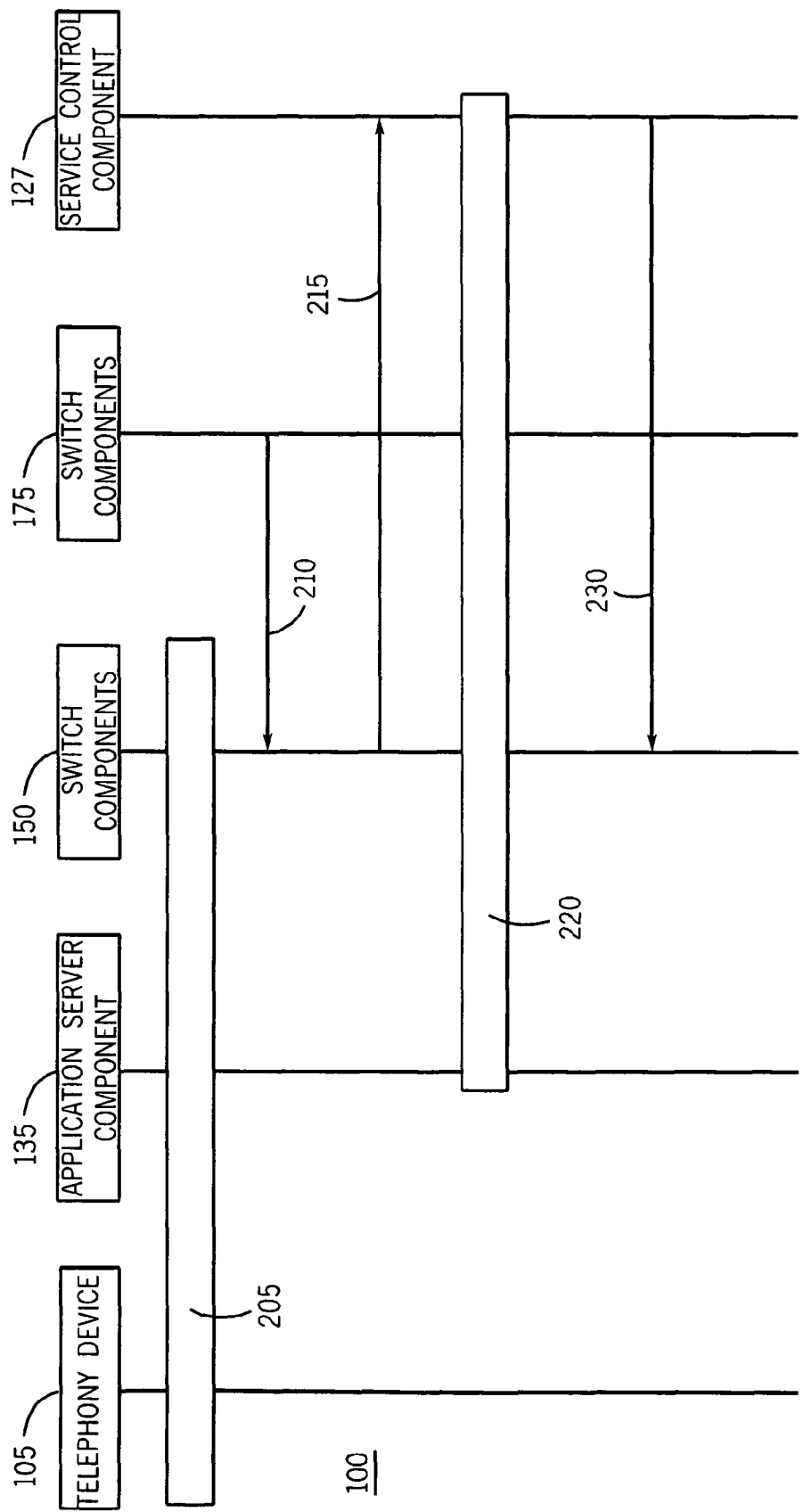
FIG. 2 is a representation of an exemplary process flow of a telephony device on a first call and a second call arriving for the telephony device of the apparatus of FIG. 1.

Turning to FIG. 2, the telephony device 105 is on a first call when the telephony device 110 (not shown) initiates a second call to the telephony device 105. The switch component 150 is pre-provisioned to communicate with the service control component 127 upon receipt of an initiation message associated with the second call. In STEP 205, the telephony device 105 is on the first call. In STEP 210, the switch component 175 associated with the telephony device 110 routes the second call to the switch component 150. In STEP 215, the switch component 150 provides an identifier associated with the application server component 135 associated with the telephony device 105 to the service control component 127. In STEP 220, the service control component 127 and the application server component 135 cooperate to establish the data stream 180. The service control component 127 and the application server component 135 in one example cooperate to develop a preferred caller list associated with the user of the telephony device 105. The service control component 127 employs a calling number of the telephony device 110 and the preferred caller list to determine the call handling service to provide for the user of the telephony device 105. In STEP 230, the service control component 127 instructs the switch component 150 to route the call to a voice mail system associated with the user of the telephony device 105.

Figure 3:
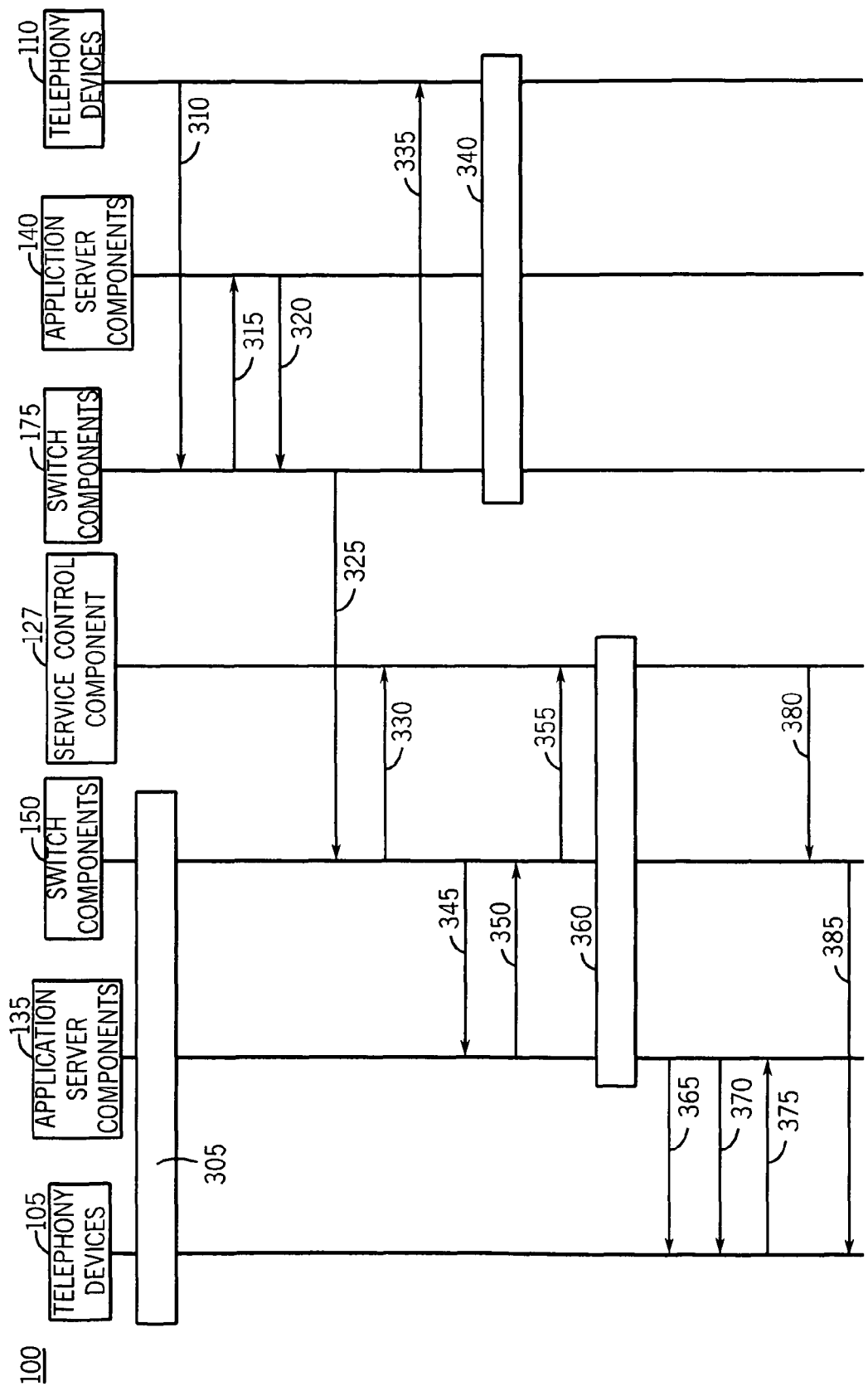
FIG. 3 is a representation of another exemplary process flow of a first telephony device on a first call and a second telephony device initiating a second call to the first telephony device of the apparatus of FIG. 1.

Turning to FIG. 3, a user of a telephony device 105 is on a first call when a user of a telephony device 110 initiates a second call to a number associated with the telephony device 105. In STEP 305, the user of the telephony device 105 is on the first call. In STEP 310, the user of the telephony device 110 cooperates with the switch component 175 to initiate the second call to the number of the telephony device 105. In STEP 315, the switch component 175 communicates with the application server component 140 to obtain an identifier 505 associated with the application server component 140. In STEP 320, the application server component 140 provides an identifier associated with the application server component 140 to the switch component 175. The switch component 175 inserts the identifier associated with the number associated with the telephony device 110 into a message 502, for example, an initiation message. In STEP 325, the switch component 175 routes the message 502 to the switch component 150.

In STEP 330, the switch component 150 provides the identifier 505 to the service control component 145. In STEP 335, the service control component 145 employs the identifier 505 to initiate a message 702, for example, a data stream request message, to the service control component 145. In STEP 340, the application server component 140 and the service control component 127 establish the data stream 185.

In STEP 345, the switch component 150 communicates with the application server component 135 to obtain an identifier 505 associated with the application server component 135. In STEP 350, the application server component 135 provides the identifier 505 associated with the application server component 135 to the switch component 150. In STEP 355, the switch component 150 employs a Transactional Capabilities Application Part query to provide the identifier 505 associated with the application server component 135 to the service control component 145. In STEP 360, the service control component 127 employs the identifier 505 associated with the application server component 135 to initiate a message 705, for example, a data stream request message, to the application server component 135. The service control component 127 and the application server component 135 establish the data stream 180. In STEP 365, the application server component 135 dialogues with the user of the telephony device 105 to prompt the user of the telephony device 105 of the second call. In STEP 370, the user of the telephony device 105 accepts the second call and the application server component 135 presents the call to the telephony device 105. In STEP 375, the user of the telephony device 105 accepts the second call. In STEP 380, the service control component 127 instructs the switch component 150 to route the call to the telephony device 105. In STEP 385, the switch component 150 routes the call to the telephony device 105.

The apparatus 100 in one example comprises a plurality of components such as computer software and/or hardware components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example employs at least one computer-readable medium. One example of a computer-readable medium for the apparatus 100 comprises an instance of a recordable data storage medium such as one or more of a magnetic, electrical, optical, biological, and atomic data storage medium. The recordable data storage medium in one example comprises the storage device 101. An exemplary component of the apparatus 100 employs and/or comprises a set and/or series of computer instructions written in or implemented with any of a number of programming languages, as will be appreciated by those skilled in the art.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A network, comprising:
a service control component that provides to one or more telephony devices of a plurality of telephony devices on a call, one or more services associated with one or more numbers associated with the one or more telephony devices on the call; and
one or more application server components connected to the service control component and one or more switch components, the one or more application server components being configured to
cooperate with the service control component through employment of a Session Initiation Protocol to establish one or more data streams to communicate information between the service control component and the one or more application server components to provide the one or more services,
communicate with the one or more switch components via the Session Initiation Protocol, and
cooperate with the service control component and the one or more switch components to transmit one or more user inputs for the call.

2. The network of claim 1, wherein the one or more numbers associated with the one or more telephony devices on the call comprise one number associated with one telephony device on the call, and wherein one application server component of the one or more application server components is associated with the one number associated with the one telephony device on the call; and
wherein the service control component and the one application server component associated with the one number associated with the one telephony device establish one or more of the one or more data streams associated with the call; and
wherein the service control component and the one application server component employ the one or more of the one or more data streams associated with the call to provide the one or more services associated with the one number associated with the one telephony device.

3. The network of claim 2, wherein the service control component and the one application server component communicate information associated with the one number associated with the one telephony device through employment of the one or more of the one or more data streams; and
wherein the service control component and the one application server component employ the information to provide the one or more services to the one telephony device.

4. The network of claim 3, wherein the one or more services comprise one or more routing services, wherein the service control component employs the information to evaluate the one or more routing services; and
wherein the service control component communicates with a switch component to route the call based on the one or more routing services.

5. The network of claim 1, wherein the service control component obtains information from one or more of the one or more telephony devices on the call through the one or more numbers.

6. The network of claim 5, wherein the one or more of the one or more telephony devices on the call are associated with one or more application server components, and wherein the service control component and the one or more application server components cooperate to communicate information associated with the one or more of the one or more telephony devices; and
wherein the service control component and the one or more application server components cooperate through employment of the information in the data stream to provide one or more of the one or more services to the one or more of the one or more telephony devices.

7. The network of claim 1, wherein one or more identifiers comprise one or more addresses associated with the service control component; and
wherein the service control component selects one or more of the one or more identifiers to associate with the call; and
wherein the service control component employs the one or more of the one or more identifiers to establish one or more of the one or more data streams associated with the call.

8. The network of claim 1, wherein one or more identifiers comprise one or more addresses associated with one or more of the one or more application server components; and
wherein the service control component and the one or more of the one or more application server components employ the one or more identifiers to establish the one or more data streams.

9. The network of claim 8, wherein the service control component employs the one or more identifiers to initiate one or more of one or more data stream request messages to the one or more application server components; and
wherein the service control component and the one or more application server components establish the one or more data streams through employment of one or more of one or more data stream request messages.

10. The network of claim 9, wherein one or more messages associated with the call contain one or more of the one or more identifiers, and wherein the one or more of the one or more application server components and the one or more switch components cooperate to insert the one or more of the one or more identifiers within the one or more messages; and
wherein the service control component receives the one or more of the one or more identifiers from within the one or more messages.

11. The network of claim 9, wherein the one or more of the one or more data stream request messages conform to a data stream control protocol, and wherein the service control component and the one or more application server components employ the data stream control protocol to establish the one or more data streams.

12. The network of claim 8, wherein the one or more application server components establish one or more web portals with one or more of the one or more telephony devices on the call; and
wherein the service control component and the one or more application server components cooperate in employment of the one or more web portals to communicate with the one or more of the one or more telephony devices.

13. The network of claim 12, wherein the service control component and the one or more application server components receive information associated with the one or more of the one or more telephony devices through employment of the one or more web portals.

14. The network of claim 13, wherein the service control component and the one or more application server components cooperate through employment of the information associated with the one or more of the one or more telephony devices to provide the one or more services to the one or more of the one or more telephony devices.

15. The network of claim 1, wherein
the one or more switch components that cooperate with the one or more telephony devices to establish the call;
wherein the service control component communicates with one or more of the one or more switch components to establish the one or more data streams associated with the call.

16. The network of claim 15, wherein the one or more of the one or more switch components employ one or more messages to establish the call, and wherein the one or more messages contain one or more identifiers associated with the call, and wherein the one or more identifiers comprise one or more addresses associated with the one or more application server components; and
wherein the service control component communicates with the one or more of the one or more switch components to receive the one or more identifiers from within the one or more messages; and
wherein the service control component employs the one or more identifiers to establish the one or more data streams with the application server component.

17. The network of claim 16, wherein the service control component and the one or more of the one or more switch components employ one or more service control protocols to associate the identifier with the call.

18. The network of claim 17, wherein the service control component and the one or more of the one or more switch components employ one or more Transactional Capabilities Application Part (TCAP) queries to associate the identifier with the call.

19. The network of claim 18, wherein the service control component and the one or more of the one or more switch components employ one or more Session Initiation Protocol (SIP) queries to associate the identifier with the call.

20. The network of claim 15, wherein the one or more of the one or more switch components employ one or more messages to establish the call, and wherein the one or more messages contain one or more identifiers, and wherein the one or more identifiers are associated with the one or more service control component; and
wherein the service control component and the one or more of the one or more switch components cooperate to select the one or more identifiers; and
wherein the service control component and the one or more of the one or more switch components employ the one or more messages to provide the one or more identifiers associated with the service control component to one or more application server components associated with the call.

21. The network of claim 1, wherein the one or more application server components cooperate with the service control component through employment of the Session Initiation Protocol or a Transfer Control Protocol to establish the one or more data streams between the service control component and the one or more application server components to provide the one or more services.

22. The network of claim 1, wherein the one or more application server components cooperate with the service control component through employment of the Session Initiation Protocol or a User Datagram Protocol to establish the one or more data streams between the service control component and the one or more application server components to provide the one or more services.

23. The network of claim 1, wherein the one or more application server components and the service control component employ a network address, a port, and an identification tag to associate the one or more data streams with one or more calls.

24. The network of claim 1, wherein at least one of the one or more telephony devices is a web-enabled devise.

25. The network of claim 1, wherein the one or more application server components employ one or more numbers associated with the one or more telephony devices to select one or more stored instructions associated with one or more enhanced call processing services.

26. A method for providing one or more services to one or more telephony devices on a call, the one or more services being based on information associated with one or more of the one or more telephony devices on the call, the method comprising the steps of:
establishing communications between one or more service control components and one or more application server components through a Session Initiation Protocol to establish one or more data streams based on the information and between the one or more application server components and one or more switch components via the Session Initiation Protocol so that the one or more application server components can cooperate with the service control component and the one or more switch components to transmit one or more user inputs for the call; and
providing the one or more services to the one or more telephony devices based on the one or more data streams established between the one or more service control components and the one or more application server components.

27. The method of claim 26, wherein one or more messages serve to establish the call, and wherein the one or more messages comprise one or more identifiers associated with the one or more of the one or more application server components, and wherein the step of establishing the one or more data streams between the one or more of the one or more service control components and the one or more of the one or more application server components further comprises the steps of:
receiving the one or more identifiers from within the one or more messages; and
establishing, by the one or more of the one or more service control components, the one or more data streams with the one or more of the one or more application server components associated with the one or more identifiers.

28. A computer-readable medium having computer executable instructions for performing steps, comprising:
means for providing, by one or more service control components communicating with one or more application server components and one or more switching components, one or more services to one or more telephony devices on a call through employment of a Session Initiation Protocol to establish one or more data streams between the one or more service control components and the one or more application server components;
wherein the one or more application server components cooperate with the service control component and the one or more switch components to transmit one or more user inputs for the call; and
wherein the one or more services are based on information associated with one or more of the one or more telephony devices on the call.

* * * * *